(12) United States Patent
Valliere (10) Patent No.: US 10,547,915 B1
(45) Date of Patent: Jan. 28, 2020

(54) SYSTEM AND METHOD FOR OPTIMIZING PLAYLIST INFORMATION FOR ULTRA LOW LATENCY LIVE STREAMING

(71) Applicant: Jonathan James Valliere, Stuart, FL (US)

(72) Inventor: Jonathan James Valliere, Stuart, FL (US)

(73) Assignee: Look At Me, Inc., Stuart, FL (US)

( * ) Notice: Subject to any disclaimer, the term of this patent is extended or adjusted under 35 U.S.C. 154(b) by 0 days.

(21) Appl. No.: 16/516,718

(22) Filed: Jul. 19, 2019

(51) Int. Cl.
*H04N 9/80* (2006.01)
*H04N 21/845* (2011.01)
*H04N 21/81* (2011.01)
*H04N 21/262* (2011.01)
*H04L 29/06* (2006.01)

(52) U.S. Cl.
CPC ......... *H04N 21/845* (2013.01); *H04L 65/608* (2013.01); *H04N 21/26241* (2013.01); *H04N 21/812* (2013.01)

(58) Field of Classification Search
CPC .............. H04N 21/845; H04N 21/812; H04N 21/26241; H04L 65/608
USPC ................ 386/241, 248, 249, 250
See application file for complete search history.

(56) References Cited

U.S. PATENT DOCUMENTS

| | | | | |
|---|---|---|---|---|
| 2003/0001880 A1* | 1/2003 | Holtz | ............ | G06Q 30/06 715/716 |
| 2003/0033157 A1* | 2/2003 | Dempski | ............ | H04N 5/4401 725/32 |
| 2010/0306402 A1* | 12/2010 | Russell | ............ | H04N 21/235 709/231 |
| 2015/0326945 A1* | 11/2015 | Johnson | ............ | H04N 21/812 725/32 |

* cited by examiner

*Primary Examiner* — Helen Shibru (57) ABSTRACT

The present invention provides a major innovative development in low latency live streaming at scale which includes a Viewer to transmit a series of requests for Media Segments ahead-of-time the Media Segment data is expected to exist and a Server capable of delivering Media Segment data, as it is being generated, to one or more Viewers. Specifically, the invention incorporates a method of embedding Playlist Data into Media Segment data to enhance ultra-low latency playback, while providing an immediate transferring of essential Playlist Data to the Viewer.

16 Claims, 9 Drawing Sheets

SYSTEM AND METHOD FOR OPTIMIZING PLAYLIST INFORMATION FOR ULTRA LOW LATENCY LIVE STREAMING

TECHNICAL FIELD

The subject of the invention is improving the broadcasting, distribution, and delivery of live audio/video over the internet using a Request-Response protocol.

BACKGROUND

For nearly a decade, the live streaming industry has been searching for a viable alternative to RTP and RTMP to deliver large-scale ultra-low latency live streaming which is economically viable. While there have been many experiments using HTTP/2 push, WebSockets, coordinated-clock segment prediction, and reducing the duration of individual media segment/media blocks to reduce the live streaming delay, none have proven to be a resilient solution, meeting all the business and consumer requirements of modern ultra-low latency live streaming.

SUMMARY

The present invention provides a major innovative development in low latency live streaming at scale which includes a Viewer to transmit a series of requests for Media Segments ahead-of-time the Media Segment data is expected to exist and a Server capable of delivering Media Segment data, as it is being generated, to one or more Viewers. Specifically, the invention incorporates a method of embedding Playlist Data into a Media Segment to enhance ultra-low latency playback, while providing an immediate transferring of essential Playlist Data to the Viewer.

DETAILED DESCRIPTION

Ever since the Trojan Room Coffee Pot, engineers have been developing new methods of media streaming over the Internet. The first successful open-specification live media streaming protocol for Audio/Video was RTP. In RTP, the Player opens specific UDP ports and requests that the Server send media frames to those ports. This solution is low latency because media is simply pushed to the Player until the player instructs the Server to stop. The only buffering which exists in this pipeline is a jitter-buffer in the Player to prevent momentary stalls in playback due to the intermittent volatility of transmitting media over switched networks.

Since RTP requires complicated UDP management and a firewall transversal process, it isn't a practical solution for delivering media content to Web Browsers. With TCP being the Web Browser transport protocol of choice, media streaming developed around TCP. Unlike UDP, TCP provides automatic error correction, making it easier to build applications.

With the inclusion of plugin support in Web Browsers, the Flash Player introduced RTMP, a media streaming protocol built on TCP. RTMP became the most widely supported and implemented protocol to deliver media in the Web Browser. RTMP paved the way for an explosion of services dedicated to serving live broadcast streams to Viewers everywhere. Entire new economies developed revolving around monetizing live streaming. RTMP and RTP are protocols which allow the Server to push media data to the Player without delay. In fact, discounting the less optimal error correction of TCP, RTMP and RTP would have nearly identical live delays. Protocols like RTMP and RTP are referred to below as PUSH-STREAMING.

PUSH-STREAMING is technically real-time, meaning that there is no delay in transferring data as part of the functionality of the protocol. In PUSH-STREAMING, playback delay occurs at the Player in order to negate variations in network performance. As referenced below, low latency refers to a screen-to-screen delay of less than five (5) seconds. As further referenced below, ultra-low latency refers to a screen-to-screen delay of less than 2 seconds.

Live streaming Players must retrieve Media data at a rate equal to or faster than the rate Media data is exhausted by playing the Media data to prevent playback from stuttering or stalling. In most scenarios, the Player must maintain a playback buffer of Media data to compensate for minor fluctuations in the rate the Media data is received by the Player. In effect, this playback buffer causes a delay between the time the Media data is received by the Player and the time it is presented to the Viewer.

As live PUSH-STREAMING exploded, multiple live broadcasting platforms were established to make it easier to Broadcast online. These platforms are generally advertisement revenue driven; anyone can Broadcast, but Viewers must watch the advertisements. As the number of Viewers continued to grow, new methods were required to scale these Broadcasts.

PUSH-STREAMING requires a persistent communication channel between the Server and the Player. Media data is sent out immediately on the persistent communication channel as it becomes available at the Server. This design is straight-forward but introduces a number of problems when attempting to increase the number of Players. A single Server has finite computational and network capacity ultimately limiting the number of Players it can sustain at any given moment. In order to expand capacity beyond that of a single Server, stream branching was introduced.

Stream branching involves adding relaying systems downstream from a master Server. For example, if a single Server can support 500 PUSH-STREAMING Players, then a single master Server could support 500 PUSH-STREAMING Relay Servers. Using relays, the number of possible concurrent Players is increased linearly, as more Servers are introduced. However, the cost also increases dramatically. Branching comes at the cost of poor effective utilization of Server resources and suffers from the fundamental problem that any upstream "hiccups" will propagate downstream. Any error which forces data to be dropped will cause irreparable degradation and likely cause a temporary playback stall for every viewer until the next independently decodable frame becomes available.

Using stream branching, the resources of a specific quantity of Servers cannot be effectively divided to accommodate many Broadcasts simultaneously without leaving a significant amount of computational resources under-utilized. Management systems were developed to manage and scale individual Broadcasts, but the expense was still too large in the face of falling advertising revenues. PUSH-STREAMING produced low latency live broadcasting, but at a cost that was prohibitive for large scale applications.

The introduction of PULL-STREAMING changed the economics and technical operation of live broadcasting platforms but introduced significantly higher latency compared to more traditional PUSH-STREAMING. Implementations of PULL-STREAMING, such as Apple HLS and MPEG-DASH, involve converting a contiguous series of Audio/Video media frames into a sequence of individual Media Segment files. Utilizing a Playlist Document, these Media Segment files could then be downloaded by a Player and reassembled to produce a continuous stream. The use of Playlist Documents represented a dramatic change in the way Players operated; the Server was now able to effectively dictate how the Player presented the Stream.

In typical PULL-STREAMING, a Player would retrieve a Playlist Document from a Server. Upon reading this Playlist Document, the Player would begin to download Media Segments referenced in the Playlist Document. In the event the Player is playing a live stream, the Player will have to continuously re-download the Playlist Document looking for new referenced Media Segments to maintain playback. In this classical model, the Player is unable to request Media Segments without having first retrieved a Playlist Document referencing the Media Segments. The Playlist Document and Media Segments are separate resources which are retrieved from a Server.

PULL-STREAMING functions over HTTP since the target platform is Web Browser. Most media consumption devices, including TVs and DVD players now include the necessary components of a Web Browser. HTTP allows leveraging existing caching infrastructures to provide scaling, without the complicated management systems required by PUSH-STREAMING. As HTTP-based caching infrastructures became a known commodity having significant competition, the cost in offering media streaming, at scale, was reduced.

There have been many experiments to reduce PULL-STREAMING delays including decreasing segment duration, using coordinated clocks to avoid Playlist Document retrievals, tunneling PUSH-STREAMING over HTTP, and splitting Media Segments into Media Fragments to reduce the association between the block duration and the player buffer. However, each of these methods have drawbacks.

For the purpose of clarity, Media Blocks are any quantity of Media Data. Both Media Segments and Media Fragments are Media Blocks. Media Segments are Media Blocks with the specific restriction that the Media Segment must begin with an independently decodable Media frame.

Shorter Media Segment durations led to reduced Video compression quality, in turn, leading to higher bandwidth usage and decreased Video clarity. Since the number of HTTP requests are inversely proportional to the Media Segment duration, the use of shorter Media Segment duration causes linear growth in the number of HTTP request that the distribution system must support. As the target latency reduces, the tolerances of every networked communication become narrower.

The use of Coordinated Clocks for Segment Availability Prediction was first standardized as the MPEG-DASH Live profile. The primary motivation of this method was to reduce the number of times the Playlist Document must be retrieved by the Player. Using UTC clock information, stream epochs are advertised in the Playlist Document. Using a third-party clock synchronization mechanism, the Player could coordinate an offset between the local clock and a remote clock to make predictions when segments would become available. This system is complicated and continued to rely on the Playlist Document in the event that a Media Segment is produced having an irregular duration or if any other Playlist-defined feature is required. Because the Playlist Document is still required to express certain stream functions, the ability to reduce playback delay while using Coordinated Clocks for Segment Availability Prediction is limited.

As previously discussed, the number of HTTP requests per time interval to maintain playback of a Broadcast is an inverse linear function of the Media Segment or Media Block duration. A Broadcast having Media Segments of 1 second duration requires 120 HTTP requests per minute; 60 for Media Segments and 60 for Playlist Document updates. It has been proposed that Media Fragments could be utilized instead of Media Segments. The primary difference between the two is that Media Fragments are not required to be independently decodable. A dependent Media Fragment cannot be read or processed in any substantive way unless the previous independent Media Fragment is retrieved. If Media Fragments of 100 ms are utilized, the number of HTTP requests will increase 10×, further increasing the likelihood of failures. This would mean 1,200 HTTP requests per minute. When combined with Web Caching, the use of Media Fragments is almost impossible to support as the time necessary to fill and cache the HTTP response is greater than the Media Fragment's duration. Every single HTTP request is a new viable point of failure for the Player.

In a typical Broadcast network, a source Broadcast is transmitted to an Ingest Server using a PUSH-STREAMING format which is then converted into a PULL-STREAMING format. The Ingest Server may also create multiple quality renditions of the original format to reduce bandwidth. In some Broadcast networks, a source Broadcast is uploaded to an Ingest Server in a PULL-STREAMING format. This is typically used when the Broadcaster is directly generating multiple quality renditions as a cost-saving measure.

PULL-STREAMING has five primary obstacles to achieving sustainable ultra-low latency: 1) Media Segment or Media Block duration; 2) lack of synchronization between the Media Segment production and playback; 3) need for the Player to continuously retrieve the Manifest/Playlist Documents; 4) the unpredictable variable latency of the Content Delivery Network; 5) the need to periodically open new communication channels to and within the Content Delivery Network.

The present invention seeks to achieve ultra-low latency by solving all five of these obstacles. For the purpose of simplification this is accomplished by: 1) utilizing Ahead-of-Time Segment Requests; 2) combining Playlist Data and Media Data into a single payload.

Since PULL-STREAMING utilizes Playlist Documents to advertise the existence of Media Segments and the Player's desire to maintain playback without stuttering, the Player must buffer at least two Media Segments worth of data before starting playback. This allows for enough buffer time to download the next Media Segment, in sequence, before exhausting the available Media Data. In order to further decrease playback without stuttering, many Player implementations download at least three Media Segments before starting playback. Discounting network traffic and download speed, the necessary buffer time to prevent stuttering is the primary but not sole cause of playback delay with PULL-STREAMING.

Delivering content to a large audience requires the need to balance requests across a large pool of Servers in order to achieve scale. For this reason, the Viewer must periodically open new network connections to new remote devices to maintain the balance and ensure a high-level quality of service. Opening and authenticating new connections can often take upwards of 240 ms or more if the round-trip time between the two devices is 80 ms. This additional delay is totally unacceptable when using segment durations of 1000 ms or less, as it consumes such a large portion of the "acquisition window" (the amount of time allowed to acquire the next document before the viewer playback is paused) where the likelihood of an interruption in the playback drastically increases. For this reason, shifting the "connect and request" phase to a time where the "requested document" does not yet exist and not receiving a response until the "requested document" comes into existence, will "prime" this phase and shift the potential 240 ms outside of the "acquisition window". This means that the document is requested ahead-of-time it exists, both reducing the delay and increasing the critical period of time necessary to receive the requested Media Segment Data before playback is adversely affected.

The method of requesting Media Segments ahead-of-time they exist is extremely important when requesting content through a Content Delivery Network in order to offset the variable time it takes for an un-cached request to be relayed to the Origin Server.

Utilizing a hybrid PUSH-PULL-STREAMING distribution network is an effective optimization to produce efficient scalable Broadcasts while maintaining the lowest latency possible. The purpose of this design is to PUSH the Media Segment Data into geographical regions closest to the Viewers. For example, looking at the network topology of the continental United States, effective distribution may occur in Virginia, Texas, and Seattle. It is more efficient for a portion of the Content Delivery Network in California to communicate with Seattle than it is with Texas or Virginia. The shorter transmission paths improve packet loss recovery times and speeds up request fill times. Assume the Broadcaster is in Georgia. From a distance perspective, it can be expected that the communication delay between Georgia and Seattle will be greater than between Georgia and Texas or Virginia. If Broadcast data is sent to all three regions from Georgia, it is reasonable to assume that all 3 regions are slightly out of synchronization with each other due to at least the differences in lengths of the communication paths. Because well designed networks can actively reroute requests to regions that are under-utilized in order to balance network traffic, it is required that the Servers in each region be designed with specialized tolerances to prevent error signals caused by switching from one region to another and thereby prevent the disruption of a Broadcast playback.

Properly implemented, ahead-of-time Media Segment requests effectively mitigate obstacles #1, #2, #4, #5 to achieving ultra-low latency live streaming. The use of ahead-of-time Media Segment requests does not fix the internet or Content Delivery Networks; it improves how those components are effectively utilized by performing the problematic activities at a time when it isn't necessarily problematic. The beauty of this approach is that no new investment is required to improve existing Content Delivery Networks.

In one embodiment, the process of handling requests for Media Segment Data requested ahead-of-time includes the steps of: 1) evaluating whether the requested resource currently exists; 2) predicting whether the requested resource will exist in the future relative to the moment the request was received; 3) waiting for data related to said requested segment data to come into existence; 4) sending an error signal after a period of time if it does not. This allows a Player to request a Media Segment ahead-of-time it exists and receive Media Segment Data as it is being generated, in real-time. For simplicity, this can be referred to as Real-Time Transfer of Ahead-of-Time Segment Requests.

This process provides a method of making independent decisions as to the allowable tolerances that a Server should wait for a requested Media Segment to exist. This provides the necessary flexibility to deploy the solution across multiple regions and overcome the lack of instantaneous synchronization between the regions. Since this decision is independent of any external coordination, it is not affected by any potential communication delays or interruptions between regions.

When this embodiment is implemented in a PULL-STREAMING distribution network or a hybrid PUSH-PULL-STREAMING distribution network, the inherent lack of synchronization between different components of the distribution network is compensated, and errors, otherwise arising from the lack of synchronization, are mitigated. This allows Players to have requests routed between multiple out-of-sync components of the distribution network and maintain an ultra-low latency playback.

In another embodiment, the process of handling ahead-of-time requested Media Segments includes the ability to apply either a fixed or dynamic window of time within which a Server will wait for requested data to come into existence.

Unlike the prior art, a Player compatible with ahead-of-time Media Segment requests can assume the identifiers of the sequence of Media Segments and play the stream without the need to continuously retrieve a Playlist Document. In this invention, the Playlist Document serves no useful purpose and is not even required. In the prior art, any assumption of identifiers by the Player, would result in an immediate error response from the Server.

In one implementation of a Player utilizing ahead-of-time Media Segment requests to achieve ultra-low latency, at least one ahead-of-time request should be pending at all times. This means that the Player should have one in-progress request (where data is being created and transferred) and at least one pending ahead-of-time request (waiting for data) at all times during playback of the Broadcast. Where N is the last completed Media Segment index known by the Player, this means that both N+1 and N+2 should be concurrently requested by the Player. This allows for instantaneous transition of data delivery from the N+1 in-progress request to the N+2 pending request. Without the pending ahead-of-time request, a Player would be unable to manage irregular Media Segment durations without increasing the playback buffer. Another benefit of this design is that scene-optimized variable Media Segment durations can be utilized to increase Video clarity and reduce bandwidth costs while maintaining an ultra-low latency playback.

Another implementation of a Player includes requesting the next sequential Media Segment moments before the Player assumes that the current in-progress request is about to finish. This will reduce the amount of time that more than one concurrent request is pending at the Player. However, this is a less optimal solution because it may result in playback stutter in the event the current in-progress request has an unpredictable duration.

While the ahead-of-time segment requests substantially reduce the playback delay, it is impossible to maintain ultra-low latency playback and utilize a Playlist Document to enable Playlist-specific features such as discontinuity indications, advertising insertion, and others. For example, when it is necessary to indicate that a Media Segment will be discontinuous with the previous Media Segment, the entire discontinuous Media Segment will be completed and received by the Player before it can be indicated as such in the Playlist Document. This is occurring after the Player has already received the entire discontinuous Media Segment not knowing that the timestamps should be modified to be contiguous with the previous Media Segment. Accordingly, any Player wishing to use a Playlist Document for specific Media Segment instructions would be required to provide a buffer that would result in an overall latency similar to what would be expected in the prior art.

In the prior art PULL-STREAMING, the interval in which the Player retrieves the Playlist Document is not coordinated with the Server modifying the Playlist Document. These two activities were wholly independent of each other. This creates an inherent variable and random delay between the moment the Playlist Document is modified by the Server and the moment those changes are received by the Player.

Recently, the idea of utilizing wait-polling for Playlist Documents has been put forth as a method to reduce latency by synchronizing the Playlist Document changes with the Player. However, there are some major drawbacks to this approach: 1) no data can be delivered until the requested Media Segment or Media Fragment is completed and listed in the Playlist Document 2) external discontinuities and advertising insertions cannot trigger a response; 3) complex web caching may return old playlists.

In wait-polling for Playlist Documents, a Player requests the Playlist Document by including a special parameter in the HTTP request telling the Server to delay any response until a specific Media Segment and or Media Fragment with a specific Sequence Number is appended to the Playlist Document. If, for example, the Player requests the Playlist Document including the parameter for Sequence Number 400, the Server must not respond until that Sequence Number has been appended to the Playlist Document. This attempt to synchronize the Player with Playlist Document changes cannot provide ultra-low latency because responses will always be delayed by at least a Media Segment or Media Fragment duration.

It is important to note that attempting to use Media Fragment requests with wait-polling of Playlist Documents is essentially futile in practice, as the time to retrieve the Media Fragment through the Content Delivery Network usually takes longer than the play duration of that Media Fragment.

The present invention proposes a method of embedding incremental Playlist Data into the Media Segment in conjunction with a Player supporting ahead-of-time Media Segment requests. This incremental Playlist Data is not to be confused with a Playlist Document. This incremental Playlist Data only contains the new, incremental, information that would normally be appended to a traditional Playlist Document. Effectively, the incremental Playlist Data serves only as a subset of information that might otherwise be present in a traditional Playlist Document. For example, the incremental Playlist Data may contain external-clock synchronization data, discontinuity identifiers, or advertising injection information. Embedding incremental Playlist Data into Media Segments allows signaling of Playlist-specific features while maintaining ultra-low latency playback delay. For simplicity, this can be referred to as Real-Time incremental Playlist Data.

This process is achieved by inserting incremental Playlist Data into the Media Segment Data using a new ISOBMFF boxtype 'rtsb' defined to carry UTF-8 encoded String data. The 'rtsb' box is created in accordance with ISO 14496-12 Section 4.2 and is inserted into an ISO 14496-12 compliant structured Media Segment as it is being generated.

```
aligned(8) class RTSB( ) extends Box('rtsb') {
    unsigned int(8)[size]
}
```

Unlike the traditional approach of updating a Playlist Document and having the Player retrieve it at a later time, incremental Playlist Data is appended directly into the current Media Segment as it is being generated. When combined with a Player having one or more pending Segment Requests for in-progress and future Media Segments, respectively, the incremental Playlist Data is immediately sent to the Player through the in-progress Media Segment request. In some situations, it may be desirable to finalize the current in-progress Media Segment generation and append the incremental Playlist Data to the next Media Segment to be generated. The result of this functionality is that Playlist-specific features can be signaled to the Player, in real-time, without increasing the complexity of the protocol.

It is important to understand that Real-Time incremental Playlist Data requires Real-Time Transfer of Ahead-of-Time Segment Requests, otherwise it would not have any technical benefit of reducing Playback Delay, since the incremental Playlist Data would not be delivered in Real-Time.

Real-Time incremental Playlist Data and Real-Time Transfer of Ahead-of-Time Segment Requests together establish a method of producing and consuming Broadcasts with much lower playback latency. This can be accomplished in such a way that it can be implemented without customized changes to Content Delivery Networks while providing maximum tolerance for communication recovery.

The present invention discloses a method of combining Playlist Data and Media Data into a Media Segment and transferring data to Players in real-time. All element numbers are cross referenced between all figures. For example, Element 300 is the same regardless which figure it appears or what textual data may appear in the box.

Figure 1:
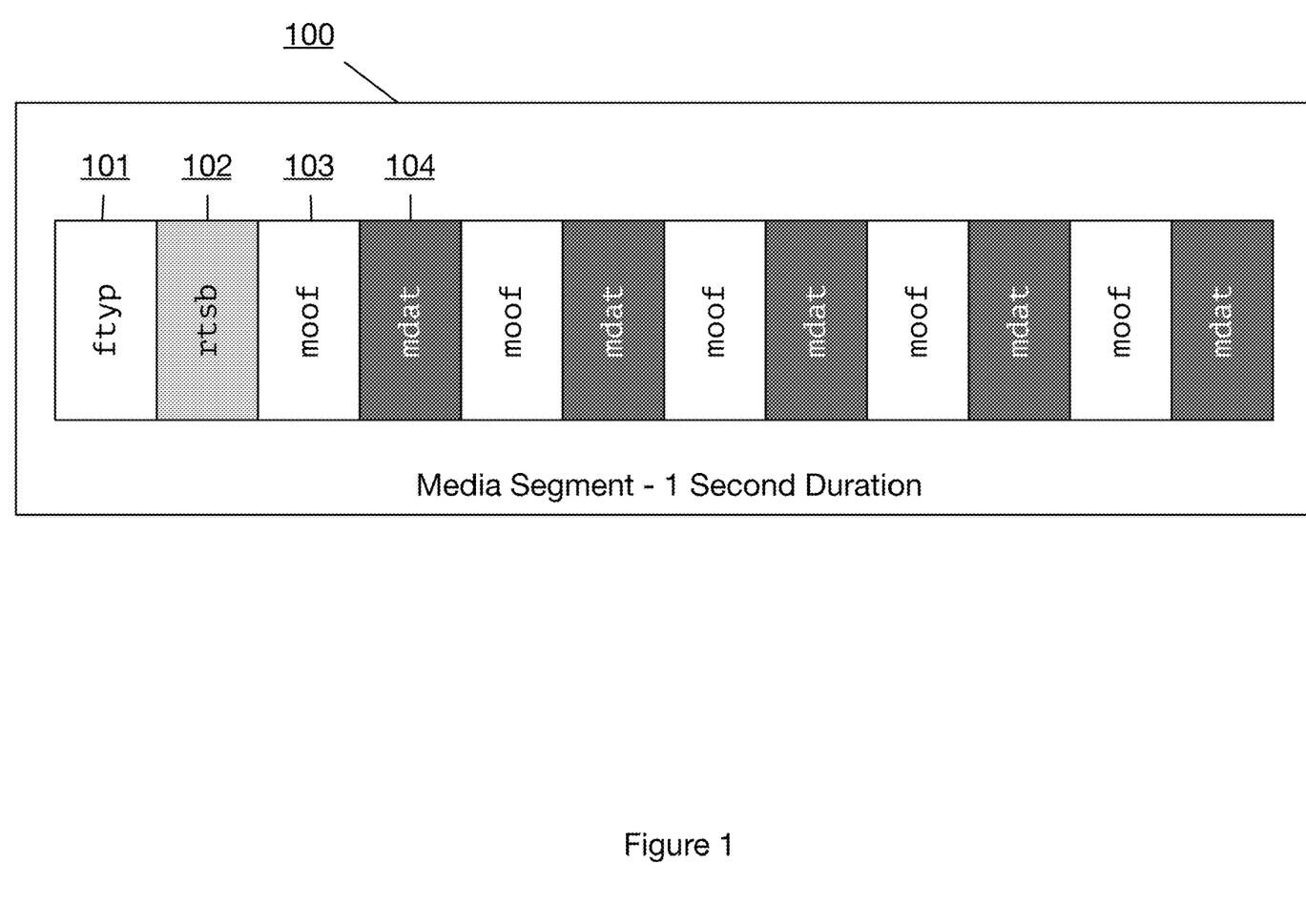
FIG. 1 represents an example of an encoded Media Segment containing embedded Playlist-data.

FIG. 1 represents an example of a Media Segment when encoded in accordance with ISO 14496-12. Element 100 represents a Media Segment containing 1 second of media data. Media data is expressed in five 'moof'+'mdat' pairs 103 and 104 respectively. In this example, pairs are referred to as Media Fragments, each having a 200 milliseconds duration. Media Fragments may have a lesser or greater duration. Segment 100 has 'rtsb' box 102 containing the Playlist Data specific to this Media Segment. For example, this may contain program-date-time, discontinuity, and other information. For example, the 'rtsb' box contains UTF-8 text data being in compliance with either the Apple HLS or MPEG-DASH Playlist specifications. The 'rtsb' box may contain 'EXT-X-PROGRAM-DATE-TIME' tag to provide remote clock coordination information used to synchronize the presentation of multiple camera angles of a single event. The 'rtsb' box may also contain 'MEDIA-SEQUENCE' or 'DISCONTINUTIY-SEQUENCE' representing the number of this Media Segment and the Discontinuity Number which is used to understand whether this Media Segment is discontinuous with the previous continuity sequence. This allows a Player to skip retrieval of one or more Media Segments and be capable of correctly presenting the next retrieved Media Segment using the correct timestamp information to present the Media as a continuous stream.

Figure 2:
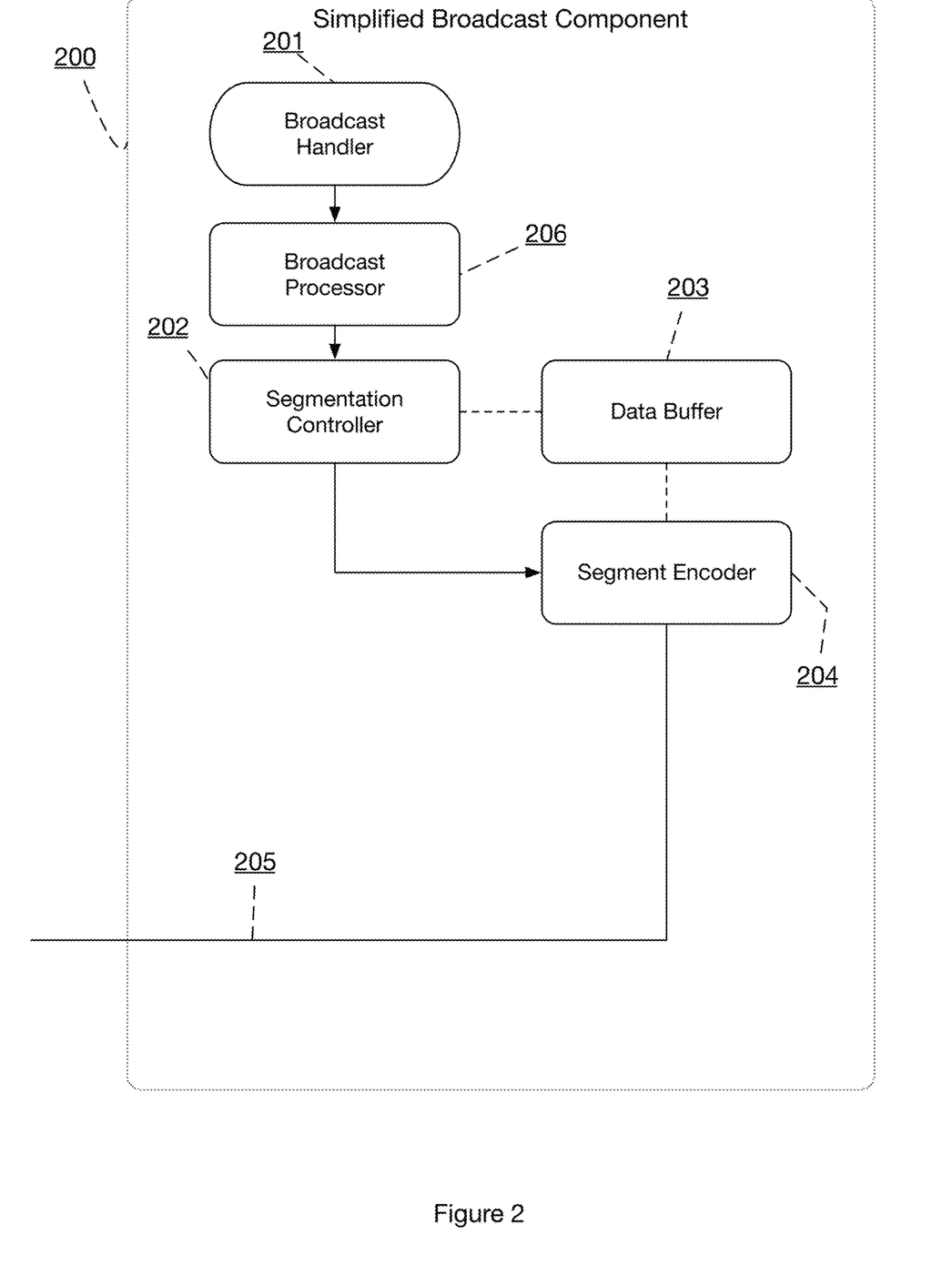
FIG. 2 represents a Simplified Broadcast Component for generating Media Segments.

FIG. 2 represents a simplified broadcast component which is responsible for receiving broadcast media and converting it into individual Media Segments. FIG. 2 may be implemented at a Server remote from the Broadcaster or may be implemented as part of the Broadcaster directly. Broadcast data is first received by the Broadcast Handler 201. Data received by the Broadcast Handler 201 has timestamp and other coding information read by the Broadcast Processor 206 in order to signal the Segmentation Controller 202 to decide what should be done with a received Media Frame and/or Signal Data. The Segmentation Controller 202 is responsible for maintaining records of the timestamp information of the frames currently assigned to the current in-progress Media Segment. The Segmentation Controller 202 has data pertaining to the duration of the Media Frames written to the current in-progress Media Segment and the desirable target duration of Media Segments. The target Media Segment duration utilized by the Segmentation Controller 202 is configurable. When the Segmentation Controller 202 receives a new Media Frame, it must decide whether the new Media Frame should be appended to the current Media Segment or whether the current Media Segment should be finalized (will no longer be appended), and said new Media Frame should be appended to the next Media Segment.

Figure 3:
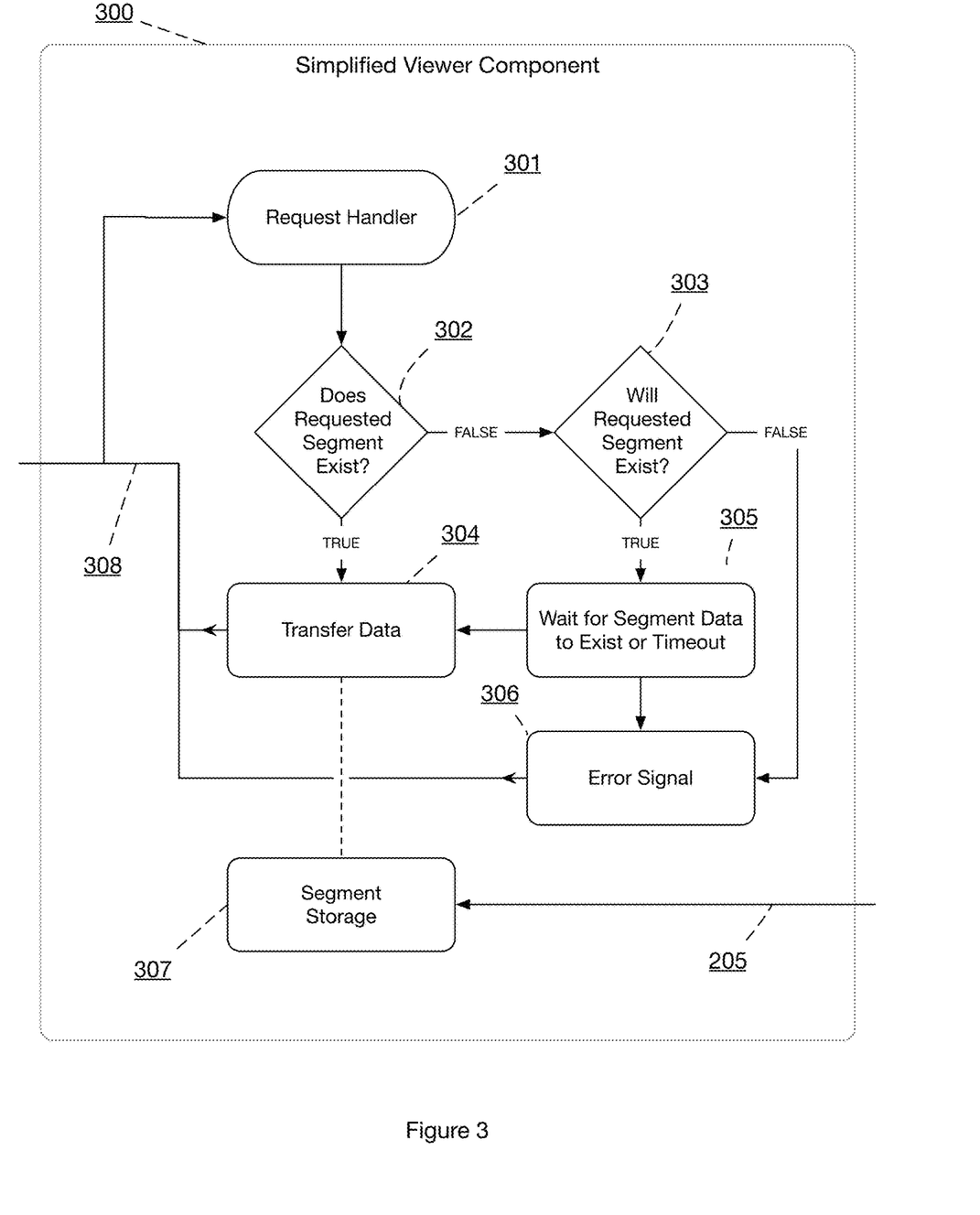
FIG. 3 represents a Simplified Viewer Component for handling and responding to requests for Media Segment data from Players/Viewers.

Media Frames are temporarily stored in the Data Buffer 203 until such time as they should be flushed to the Media Segment document using the Segment Encoder 204. The Segmentation Controller 202 may store more than one Media Frame in the Data Buffer 203 to improve the performance of the Segment Encoder 204 by encoding multiple Media Frames, Markers, or Playlist Data at once. In Media Segment 100 which contains five Media Fragments, it is reasonable to assume that as many as ten audio frames exist within each Media Fragment having a total duration of around 200 milliseconds. The Segmentation Controller 202, having received a Media Frame it will append to the current in-progress Media Segment, will store the Media Frame in the Data Buffer 203 until the Data Buffer 203 contains enough Media for the Segmentation Controller 202 to flush to the Segment Encoder 204. The Segment Encoder 204 may store the raw Media Segment data anywhere it is useful. In this example, the Media Segment data is stored in common Segment Storage 307. Line 205 connects from Segment Encoder 204 to Segment Storage 307.

Figure 4:
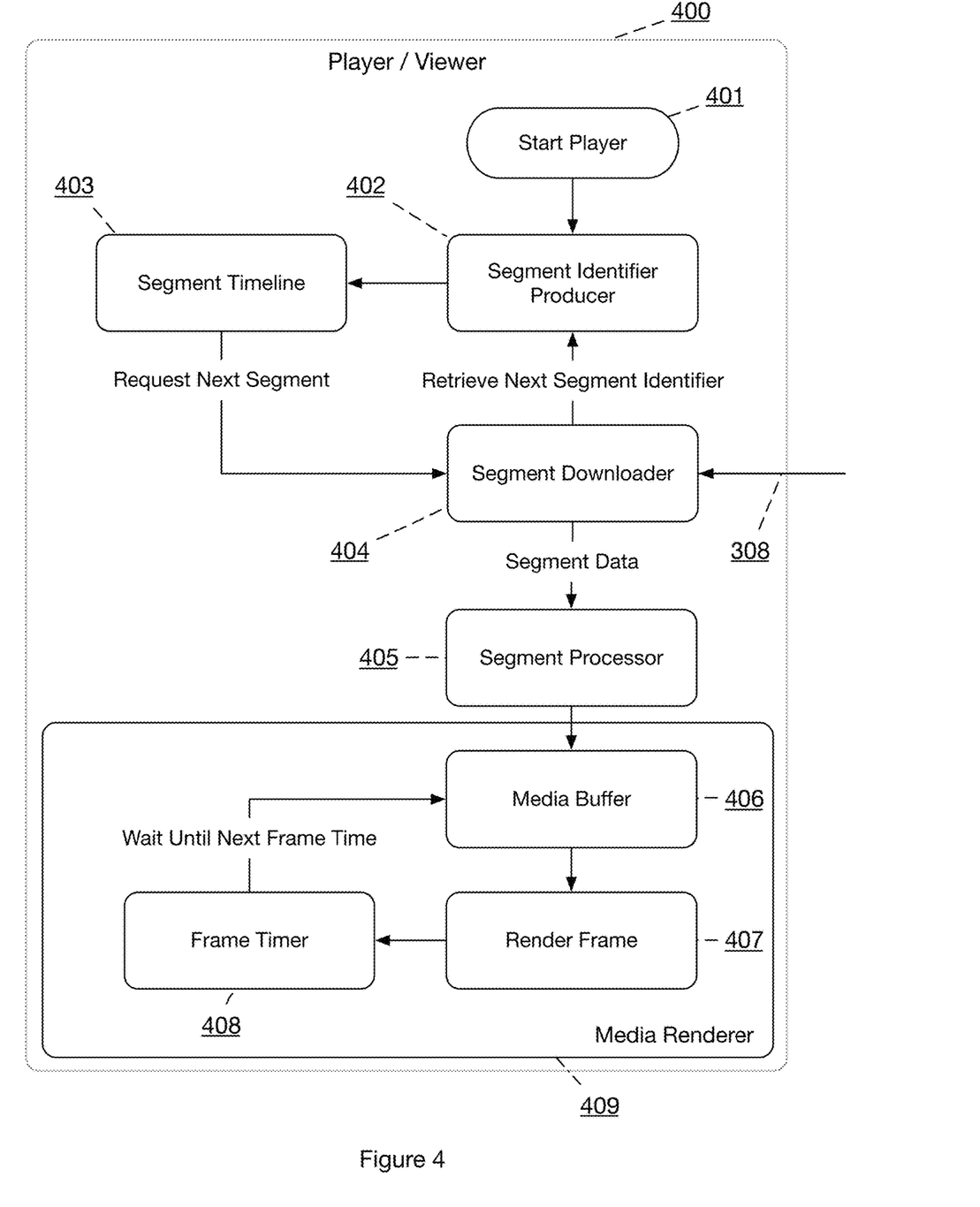
FIG. 4 represents a Player/Viewer for retrieving Media Segment data and presenting it to the User.

FIG. 3 represents a Simplified Viewer Component 300 having the responsibility of receiving requests from a Viewer/Player and responding with Media Segment data. Requests for Media Segments first come from the Segment Downloader 404 using line 308. Requests are received by the Request Handler 301. It is assumed, but not required, that Segment Downloader 404 is communicating with Request Handler 301 over an IP network.

The Simplified Viewer Component 300 differs from the prior art in that it contains the ability to suspend error signals in the event that the requested Media Segment does not currently exist in Segment Storage 307. Element 300 also has the ability to utilize advanced prediction methods to limit which error signals should be suspended and for how long.

Following the prior art, having received the request at the Request Handler 301, the determination must be made "Does Requested Segment Exist?" in 302. This requires checking Segment Storage 307 to determine whether data belonging to said requested Media Segment currently exists. In the event that evaluation 302 is TRUE, flow progresses to 304 where Segment Data is read from Segment Storage 307 and delivered to the Player via 208. The prior art would dictate that a FALSE evaluation would cause an error signal to be sent back to the Player. In this present invention, however, the FALSE evaluation requires a secondary evaluation "Will Requested Segment Exist?" in 303. This secondary evaluation seeks to determine whether the requested segment is likely to exist in the future.

The evaluation 303 may be accomplished in a number of ways. A simple method includes comparing the Sequence Number of the requested Media Segment with the Sequence Number of the last known created Media Segment. The Sequence Number is an integer assigned to the Media Segment indicating the placement within the broadcast/stream of Media Segments. This Sequence Number is often included in the file name of the Media Segment, for simplicity. For example, Media Segments may have an identifier or file names like "media-1904.ts". The number #1904 is the Sequence Number. If the last known Sequence Number is #1900, then it is reasonable to assume that #1904 will come into existence in the future. Optionally, a window of allowable future Sequence Numbers/Segment Numbers may be used to restrict which future Media Segment requests will be allowed to progress to 305. If Sequence Number #1904 is more than one (1) greater than the last Sequence Number, the Media Segment duration history can be analyzed to estimate the time that #1904 will begin. If the current Sequence Number is #1900 and the Media Segment duration history median value is approximately one (1) second, then it can be assumed that #1904 will exist four (4) seconds into the future. In order to protect the Server from unreasonable requests, it is important to limit the window in which future Media Segments can be requested to approximately five (5) times the median Media Segment duration. The window, in which Viewers may request Media Segments that may exist, is configurable.

In the event that the requested Sequence Number is less than the last Sequence Number and had already failed the prior condition 302, then it is assumed that it was deleted as part of a rolling window of segment availability, and an error will be returned in 306.

Once evaluated TRUE by 303, flow progresses to 305 where the Simplified Viewer Component 300 will suspend the request until such a time that the Media Segment data becomes available or a period of time passes during which the data was expected to become available. This serves as a backup for situations where the evaluation 303 was incorrect. In the event that the Media Segment data does not become available within the period of time (or a number of segment durations), flow will progress to 306 where an error signal will be sent to the Viewer via 308. In the event that the Media Segment does become available, flow will progress to 304 where data will be transferred to the Viewer as it becomes available until the entire Media Segment is transferred.

FIG. 4 represents a simplified view of a Broadcast Player. For reference, the terms "Player" and "Viewer" can generally be used interchangeably. The Player has two primary function loops required to retrieve and present the Media to the User.

The first functional loop consists of Segment Identifier Producer 402→Segment Timeline 403→Segment Downloader 404→Segment Identifier Producer 402. In the prior art, the Segment Identifier Producer 402 may include downloading a Playlist Document from a Server. In the present invention, however, Segment Identifier Producer 402 dynamically produces the Media Segment URLs using a pre-defined pattern. Dynamically producing the URLs when combined with the waiting and an error signal mechanism in the Simplified Viewer Component 300 produces a self-correcting method of requesting Media Segments. The process of dynamically producing the URLs means that the Player is not dependent on a Playlist Document for Media Segment advertisements. This lowers playback latency and improves the stability of the entire retrieval process. Media Segment data is retrieved via Segment Downloader 404, then passed into Segment Processor 405 where the data will be parsed and queued for playback in the Media Buffer 406. When one Media Segment is downloaded, the process loops back to 402 and 403. This first functional loop occurs indefinitely causing the Player to continuously request and retrieve Media Segment data until the User instructs the Player to stop.

Additionally, the Segment Identifier Producer 402 may produce the URLs from other means such as Playlist Documents or equivalent containing future Media Segment URLs or using a method to push new identifiers from a Server.

The second functional loop consists of Media Buffer 406→Render Frame 407→Frame Timer 408→Media Buffer 406. The purpose of this loop is to render the Media and present it to the User. Media is appended to the Media Buffer 406 when Media Segment data is received by 404 and processed by Segment Processor 405. When enough Media is in the Media Buffer 406, individual Media frames will be rendered based on the time in which they should be presented. For example, if there are 20 Media frames per second then one Media frame should be rendered every 50 milliseconds.

Figure 5:
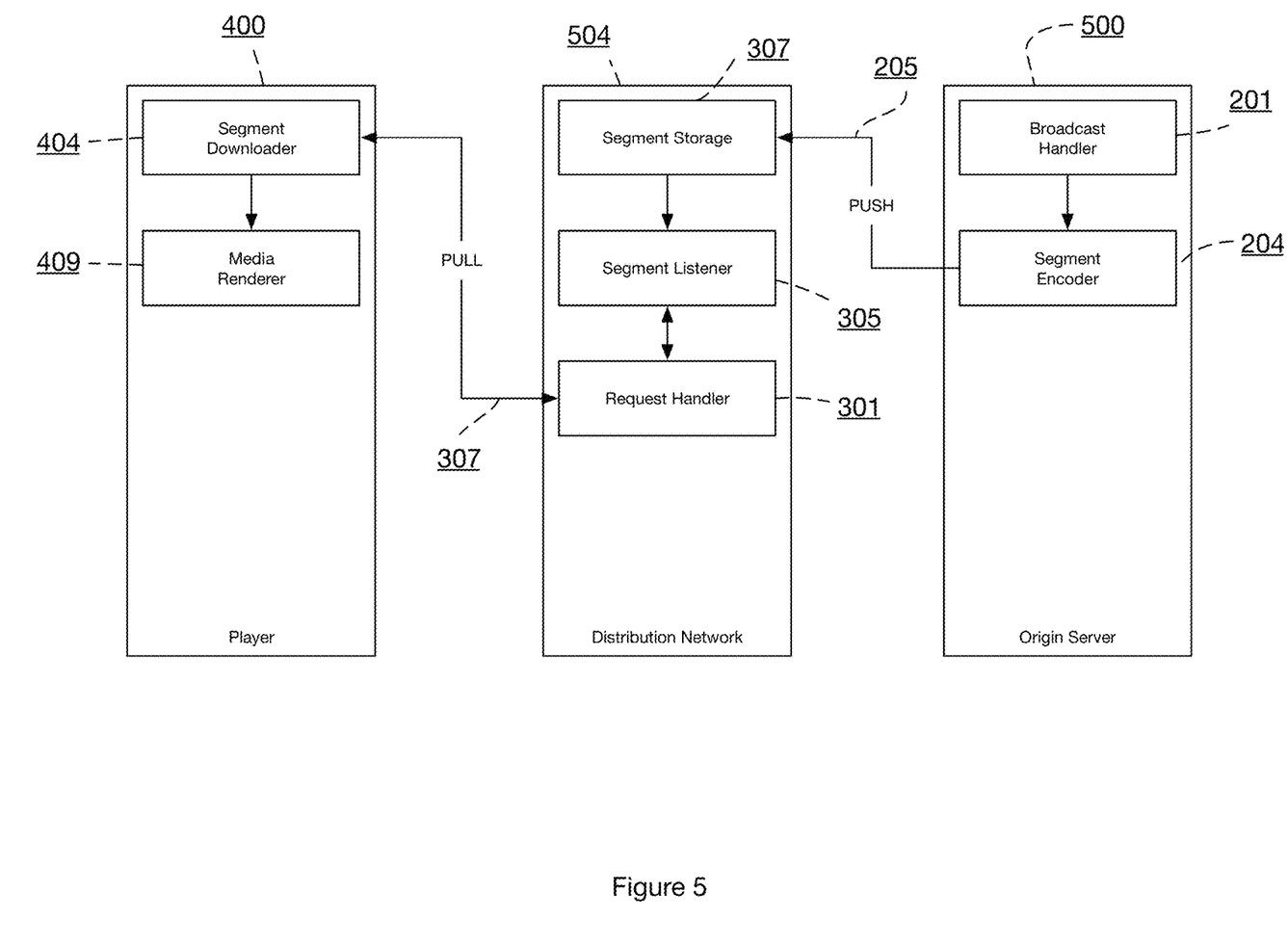
FIG. 5 illustrates the overall distribution mechanism, how Media flows from the Origin Server to the Player in real-time.

FIG. 5 shows the complete high-level distribution system showing how Media is received by the Broadcast Handler 201 all the way to playback in the Media Renderer 409. The Origin Server 500 receives the Broadcast data via the Broadcast Handler 201. The data is parsed and encoded into Media Segments via the Segment Encoder 204 and pushed via 205 into the Segment Storage 307. The Distribution Network 504 may consist of a pool of servers, and Segment Storage 307 may be implemented as standard disk storage, hybrid disk and memory storage, distributed file systems, databases, etc. Optionally, it is possible to combine 504 and 500 into the same Server system.

The process of encoding Media Segments and delivering the data to the Distribution Network 504 is independent of the retrieval process initiated by the Player 400. However, when the Player is requesting Media Segments ahead-of-time they exist, any data for the specific requested Media Segment will be immediately passed from the Segment Storage 307 to the Player 400 through the Segment Listener 305 and the Request Handler 301. In this situation, data received by Broadcast Handler 201 is delivered to the Segment Downloader 404 in almost real-time. This allows the invention to achieve both scale and ultra-low latency playback in an economical way.

Figure 6:
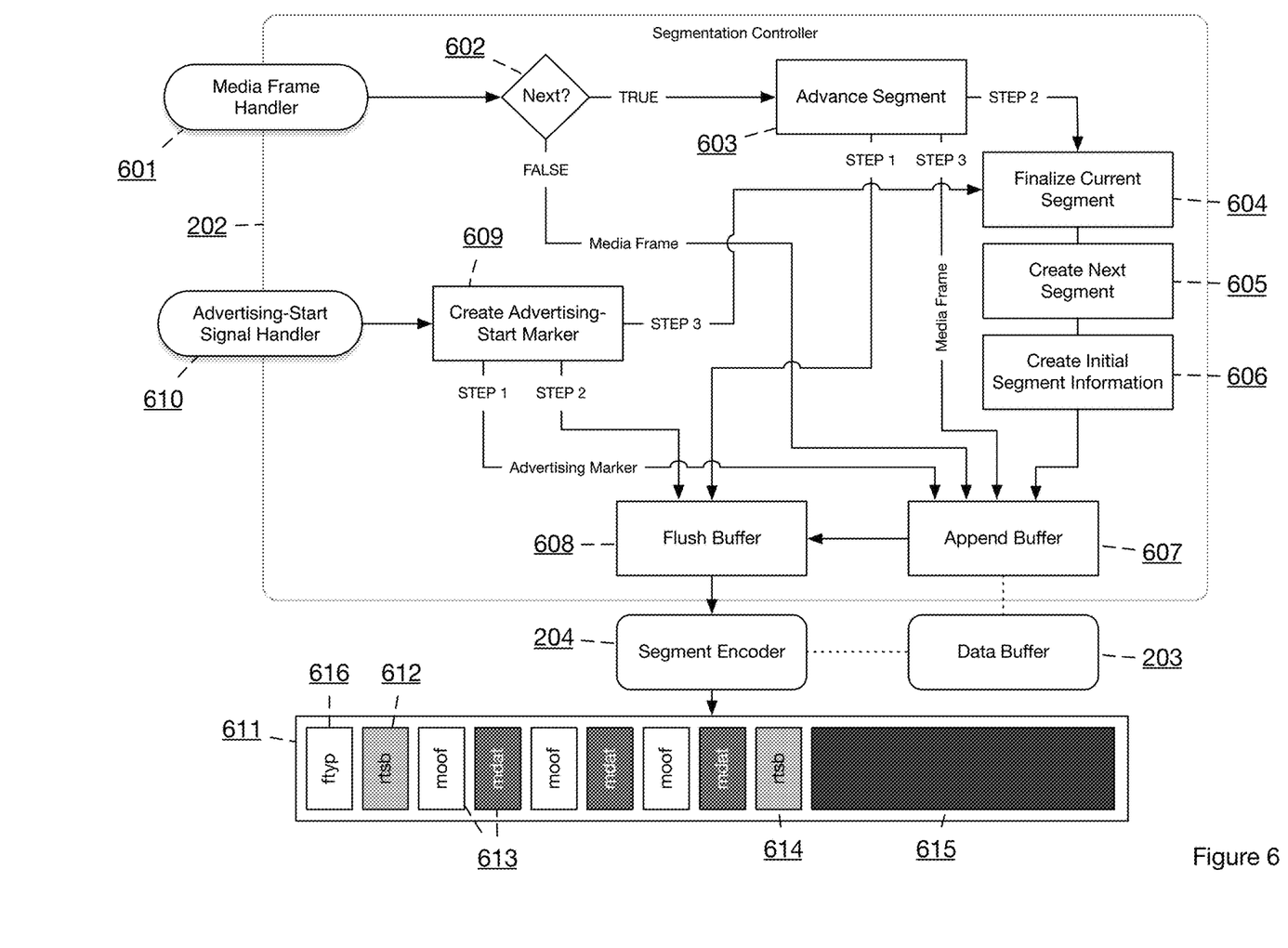
FIG. 6 illustrates a breakout of the Segmentation Controller having the ability to append Advertising-Start Markers and Playlist-data directly into Media Segments.
Figure 7:
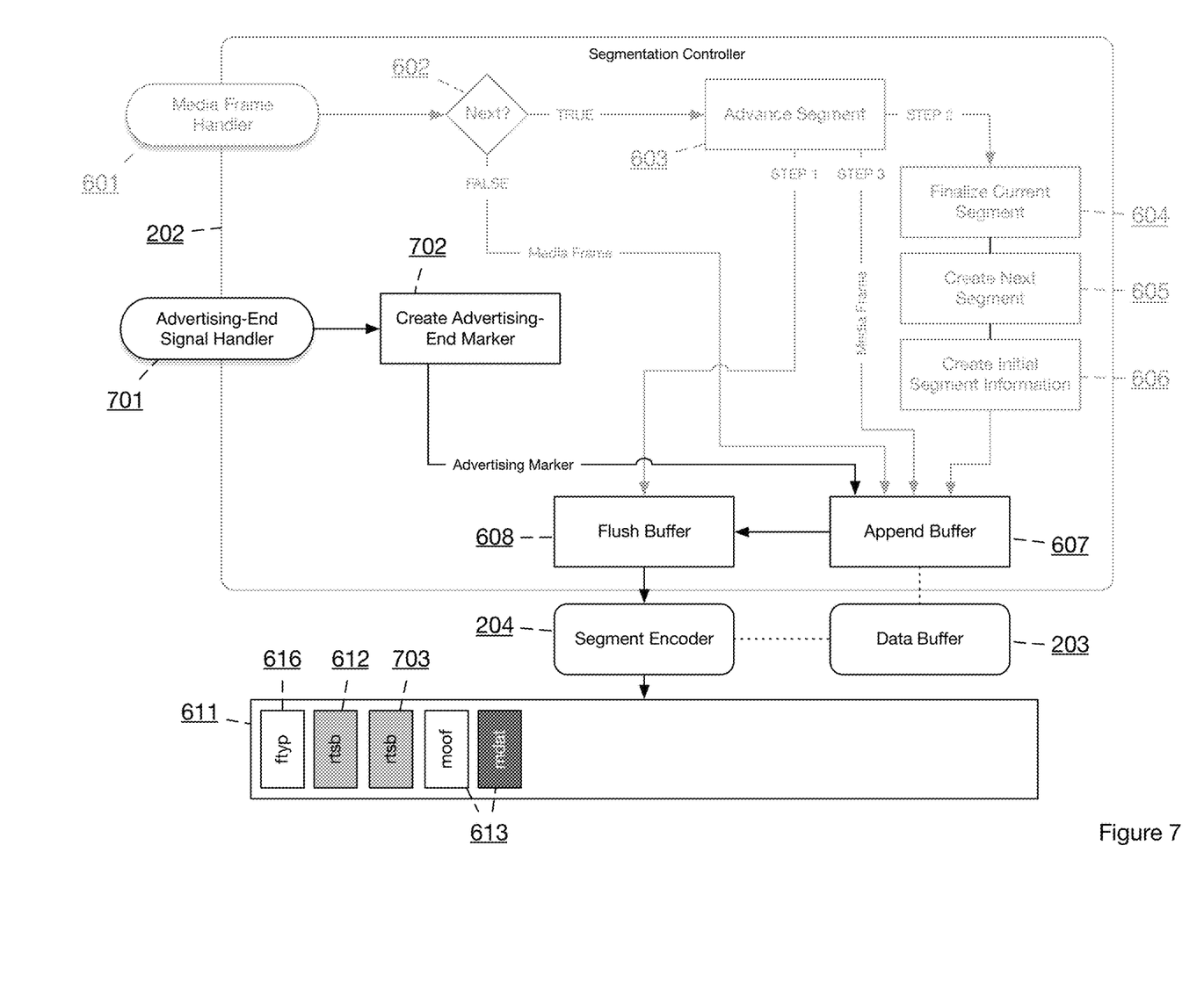
FIG. 7 illustrates a breakout of the Segmentation Controller having the ability to append Advertising-End Markers and Playlist-data directly into Media Segments.

FIG. 6 is a breakout of Segmentation Controller 202 from FIG. 2. In FIG. 2, the Segmentation Controller 202 is responsible for processing data received as part of the Broadcast having been previously processed by Broadcast Processor 206. The Broadcast Processor 206 includes the necessary functionality to process the Broadcast data and produce Media frames and other Signal data in a more readily usable format. This may include decrypting and reassembling frames from multiple packets. FIG. 6 represents the breakout of the Segmentation Controller 202 showing the prior art ability to produce Media Segments and the new ability of the present invention to append Playlist Data (Initial Segment Information and Advertising Markers) into Media Segments. FIG. 6 specifically includes the necessary functions to append Advertising-Start markers into Media Segments. FIG. 7 specifically includes the necessary functions to append the Advertising-End markers into Media Segments.

In this example, the Broadcast Processor 206 produces at least three outputs. These outputs include: Media Frame Handler 601, Advertising-Start Signal Handler 610, and Advertising-End Signal Handler 701. The Broadcast Processor 206 reads the Broadcast data and then produces the necessary signals and data frames to be handled by the Segmentation Controller 202.

The prior art method of implementing a Segmentation Controller 202 is shown in the flow from the Media Frame Handler 601 to the Media Segment document 611. As Media frames are received by the Media Frame Handler 601, flow progresses to decision 602 where a determination must be made as to whether the current Media Frame should be applied to the current or next Media Segment. Media Segments are generated sequentially and most often the decision to switch to the next Media Segment is decided based on the duration of the current Media Segment and the timestamp of the current Media Frame. For example, if the Segmentation Controller 202 desires to produce Media Segments with a target duration of 2 seconds then the decision in 602 must evaluate If the current Media Frame would make the current Media Segment longer than the target duration. Other factors are considered, such as whether the Media Frame is independently decodable. Many Segmented Streaming formats require that Media Segments begin with an independently decodable Media Frame. If the current Media Frame is not independently decodable, the Segmentation Controller 202 may intentionally create a Media Segment with a duration larger than the target duration.

If decision 602 concludes that the current Media Frame should be applied to the next Media Segment, then the TRUE evaluation flows to 603 where the buffer is flushed, and the current Media Segment is finalized. The current Media frame is then appended to the next Media Segment. The flow from 603 includes 3 steps.

Step 1 includes flushing all frames that are in the Data Buffer 203 awaiting to be written to the Media Segment 611.

Step 2 includes the larger process of finalizing/truncating/completing the current Media Segment and initializing the next Media Segment. In 604 the current Media Segment is finalized (indicating that no more data will be appended). Element 604 may modify the Media Segment document or communicate with Segment Storage 307 to indicate that the Media Segment is finalized. After 604 is completed, the next Media Segment file must be created and set as the current Media Segment in 605, so any further Media frames will be sent to this new Media Segment. When the new Media Segment is ready, it must be initialized in 606 by writing and/or queuing the necessary data to define the overall format/structure of the Media Segment. This includes writing the 'ftyp' box 616 containing the file type information as defined in ISO 14496-12. The Media Segment may also require some Playlist-specific information such as 'EXT-X-PROGRAM-DATE-TIME', 'DISCONTINUITY-SEQUENCE', 'MEDIA-SEQUENCE' or other information defined in Apple HLS or MPEG-DASH Playlist Document format. This Playlist-specific information is appended to the Media Segment using the 'rtsb' box 612 defined in this disclosure to carry the Playlist-specific information to the Player without having to use a separate Playlist Document.

Step 3 includes appending the current Media Frame to the Data Buffer 203 via 607. Depending on the configuration of 607, the Data Buffer 203 may be flushed via 608 causing the Data Buffer 203 data to be encoded and written to the Media Segment via the Segment Encoder 204. The Data Buffer 203 has a desirable maximum size before it is optimal to flush the data to the Segment Encoder 204. In our implementation, this is either 256 Kilobytes of data or 100 milliseconds in duration. The desired criteria which would cause a desirable flush of the Data Buffer 203 is configurable. In order to reduce the delay that the buffer introduces, these tolerances may be reduced to zero. In that situation, the Data Buffer 203 would be immediately flushed after it is appended in 607.

If decision 602 decides that the current Media frame should be applied to the current Media Segment, then the FALSE evaluation flows to 607 where the current Media Frame is appended to the buffer in 607 and 203.

The Broadcast Processor 206 may decode the audio signal, looking for an inaudible advertising tone to establish an advertising period of time in which it is desirable for the Player or some Middleware system to introduce an advertisement into the playback of the Broadcast. When this tone is detected, the Broadcast Processor 206 may trigger an Advertising-Start Signal Handler 610 or Advertising-End Signal Handler 701. The limited advertising period of time is indicated as the time between the Advertising-Start and Advertising-End Signals. In another example, the Broadcast Processor 206 may parse SCTE-35 markers from MPEG-TS coded Media. How the Broadcast Processor 206 processes the Broadcast is dependent on the specifications of the Broadcast format.

In this present invention, the Broadcast Processor 206 triggers the Advertising-Start Signal Handler 610 or the Advertising-End Signal Handler 701 when a specific advertising marker should be appended to the Media Segment. Handler 610 triggers 609 to create and append an advertising marker. Element 609 has three steps.

Step 1 includes creating and appending the advertising frame to the Data Buffer 203 via 607. This advertising frame will produce an 'rtsb' box 614 in the Media Segment when flushed to the Segment Encoder 204 in Step 2. Optionally, Element 609 may cause Media Frame Handler 601 to drop incoming Media Frames until the advertising period ends. Since no new Media frames will be received for a period of time, it is recommended to finalize the current Media Segment by cutting the expected duration short. The difference between the expected Media Segment duration and the actual duration, due to being cut short, is represented as 615. Finalizing the Media Segment allows all middleware systems, such as Content Delivery Systems, and User systems, such as Players, to understand that no more data will be appended to this current Media Segment. This is important because many of these components may incorrectly assume that a response which does not receive any data, for an extended period of time, to be the result of some kind of communications failure. For this reason, it is optimal to finalize the current Media Segment when the Segmentation Controller 202 knows that no new Media will be available for a period of time. In Step 3, the current Media Segment is finalized at element 604 at which the rest of the process follows to 606.

In FIG. 6, the Advertising-Start Marker is appended, and the related Media Segment is finalized. FIG. 7 represents the second stage of FIG. 6 wherein the Advertising-End Marker needs to be appended to the Media Segment to alert any Players that Media frames will begin to flow again. Most elements in FIG. 7 are also present in FIG. 6. The Advertising-End Signal Handler 701 is triggered by the Broadcast Processor 206 from information present in the Broadcast where the desired effect is to notify the Players that the advertising period has ended, and that Media Frames will commence. Element 701 flows to 702 where the Advertising-End Marker is created and appended to the Data Buffer 203 via 607. When the Advertising-End Marker is flushed to the Segment Encoder 204 via 608, it will produce a 'rtsb' box 703. Box 703 is different than the Initial Segment Information in box 612, as 703 has specific information relating to the Advertising-End Marker. It may also be possible to combine both 612 and 703 to produce a single box containing both the Initial Segment Information and the Advertising-End Marker. After the Advertising-End Marker is appended to the Data Buffer 203, it is expected that Media Frames will be received by 601 and appended to the Data Buffer 203 and ultimately to Media Segment 611 shown as 'moof'+'mdat' boxes 613.

Figure 8:
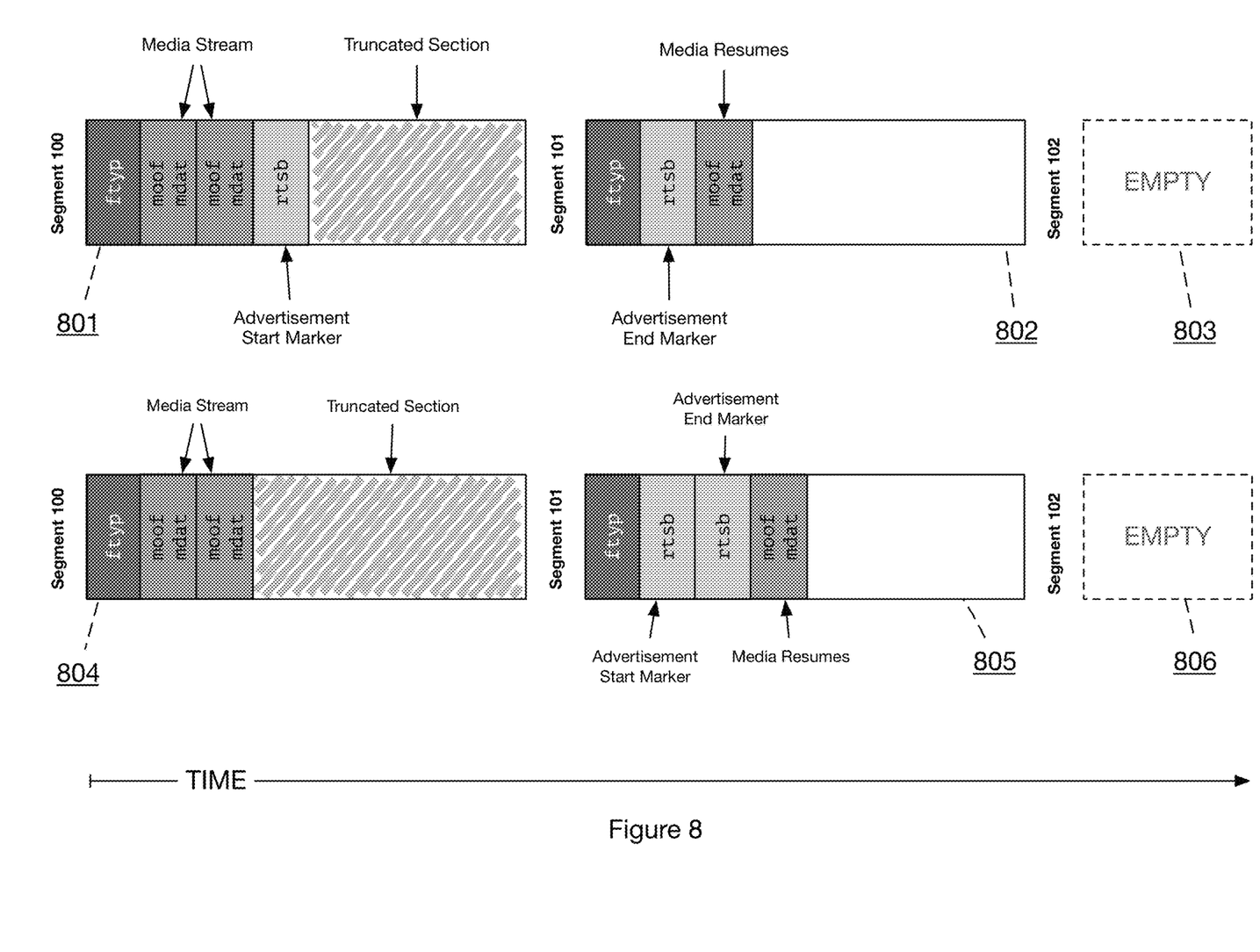
FIG. 8 illustrates examples of Media Segments generated by the Segmentation Controller having different placement of the Advertising Markers.

FIG. 8 represents the two possible sequences of Media Segments which could be generated by FIG. 6 and FIG. 7 wherein Advertising-Start and Advertising-End Markers are included in the Media Segment data.

The first sequence 801, 802, 803 includes the Advertising-Start Marker in Media Segment 801 and the Advertising-End Marker in the next Media Segment 802. When the Advertising-Start Signal is received by the Segmentation Controller 202, the Advertising-Start Marker is appended to the current Media Segment and the current Media Segment is finalized causing a shorter than expected Media Segment 801. This is an optimal solution because It does not require that a request for a Media Segment, with existing data, to be held open for a period of time in which no new data will be appended. In this sequence, the 'ftyp' and 'rtsb' boxes are not written to the Media Segment 802 until the Broadcast comes back from an advertisement period. This means that any Players or Middleware components polling on Media Segment 802 will not receive any data until the advertisement period of time has ended. Middleware systems will be able to cleanly apply Request Timeout errors because the Media Segment does not return any data whatsoever while in the middle of an advertisement period.

The second sequence 804, 805, 806 includes having both Advertising Markers (Start and End Markers) in Media Segment 805. When an Advertising-Start Signal is received by the Segmentation Controller 202, the current Media Segment is finalized causing a shorter than expected Media Segment 804, and the Advertising-Start Marker is appended to the next Media Segment.

Figure 9:
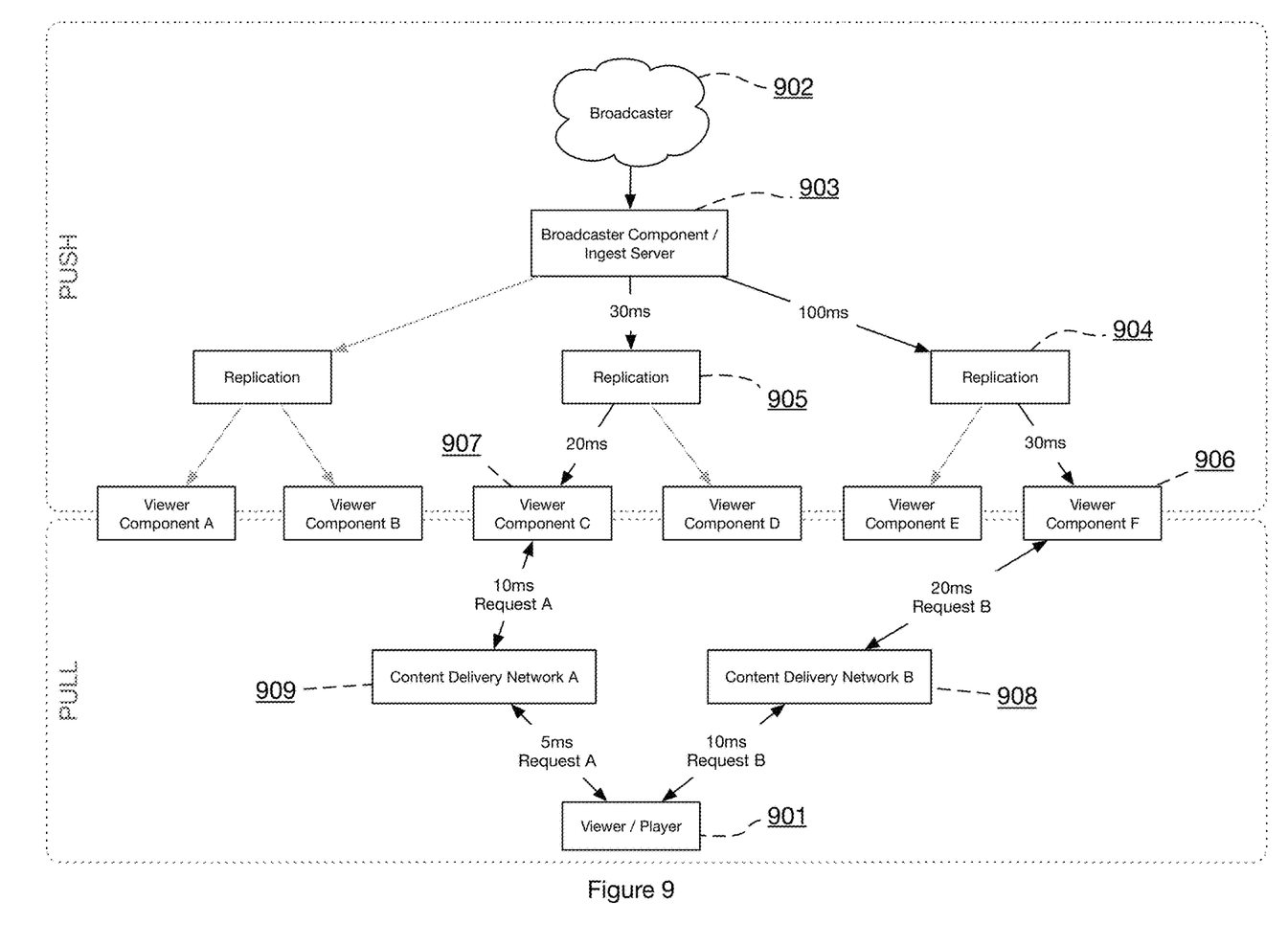
FIG. 9 illustrates an example of the PUSH-PULL STREAMING distribution network using multiple regions to create high availability while maintaining ultra-low latency.

FIG. 9 represents the hybrid PUSH-PULL STREAMING network previously described. This network utilizes a form of PUSH-STREAMING to ensure that Media Segments are delivered into a pool of Viewer Components almost simultaneously. However, due to physical distances and other variables, there are differing delays in receiving data as between various ones of said pool of Viewer Components. For example, the time it takes for data to be sent from 903 to 906 is 130 milliseconds where the time from 903 to 907 is only 50 milliseconds. This introduces the previously discussed problem where the state of Media Segments in 907 is always slightly different from 906. Without the present invention described in Simplified Viewer Component 300, a Media Segment request sent to 906, from Player 901, may result in an error response where it would have resulted in Media Segment data if sent to 907. The present invention 300 allows for the Player 901 to utilize multiple Content Delivery Networks 909 and 908 and Dynamic Routing to achieve high availability while maintaining ultra-low playback latency and reducing potential errors caused by replication delay of Media between multiple Viewer Components.

The invention claimed is:

1. In a media streaming network having a broadcast component for producing a segmented streaming broadcast and for signaling a limited advertisement period of time during which said segmented streaming broadcast may be temporarily interrupted, a viewer for requesting data segments by segment identifiers, a viewer component for receiving requests for data segments by said identifiers from said viewer and responding to said viewer with requested data, a method comprising the steps of:
    causing said viewer to possess one of said segment identifiers relating to a first data segment that does not then exist within said viewer component,
    causing said viewer to utilize said one segment identifier to request data of said first data segment from said viewer component at a time that said data has not yet come into existence within said viewer component,
    upon receiving said request from said viewer, causing said viewer component to wait for said data to come into existence,
    creating said first data segment,
    creating a first advertisement marker,
    appending said first advertisement marker to said first data segment to indicate to said viewer the start of said limited advertisement period of time, and,
    transferring at least such portion of said first data segment that contains said first advertisement marker to said viewer.

2. A method in accordance with claim 1 including the further steps of:
    establishing a target duration for said first data segment, and
    utilizing said first advertisement marker to finalize said first data segment at a time that is independent of whether said target duration has been completed.

3. A method in accordance with claim 2 including the step of utilizing said first advertisement marker to finalize said first data segment prior to the completion of said target duration.

4. A method in accordance with claim 1 including the further step of:
    creating a second data segment,
    determining that said limited advertisement period of time has ended,
    creating a second advertisement marker,
    appending said second advertising marker to said second data segment to indicate to said viewer the end of said limited advertisement period of time,
    transferring at least such portion of said second data segment that contains said second advertising marker to said viewer.

5. A method in accordance with claim 1 including the step of creating initial data segment information, and
    appending said initial data segment information to said first data segment prior to the time media data is transferred to said first data segment.

6. In a media streaming network having a broadcast component for producing a segmented streaming broadcast, a pool of servers, each of said pool of servers having a viewer component for responding to data requests from a viewer, and a viewer for requesting data segments by their identifiers, a method comprising the steps of:
    causing said viewer to possess an identifier related to a first data segment that does not then exist within at least one of said pool of servers,
    transferring said identifier from said viewer to said one of said pool of servers at a time that said first data segment has not yet come into existence,
    upon receiving said identifier from said viewer, causing said one of said pool of servers to wait for said first data segment to become available,
    creating said first data segment,
    creating initial data segment information,
    appending said initial data segment information to said first data segment and,
    transferring at least such portion of said first data segment that contains said initial data segment information to said viewer.

7. A method in accordance with claim 6 wherein said initial data segment information is appended to said first data segment prior to the time media data is transferred to said first data segment.

8. A method in accordance with claim 6 including the steps of: determining a window of time within which said one of said pool of servers will wait for said first data segment to become available,
    in the event that said first data segment does not become available at said one of said pool of servers within said window of time, then causing an error signal to be sent to said viewer.

9. A method in accordance with claim 6 where said broadcast component is configured to signal the beginning of a limited advertisement period of time during which said segmented streaming broadcast may be temporarily interrupted including the steps of:
    creating a first advertisement marker,
    appending said first advertising marker to said first data segment prior to transferring said first data segment to said viewer to indicate to said viewer the start of said limited advertisement period of time, and
    transferring at least such portion of said first data segment that contains said first advertising marker to said viewer.

10. A method in accordance with claim 9 including the further steps of: creating a second data segment,
    determining that said limited advertisement period of time has ended,
    creating a second advertisement marker,
    upon determining that said limited advertisement period of time has ended, appending said second advertisement marker to said second data segment prior to transferring said second data segment to said viewer to indicate to said viewer the end of said limited advertisement period of time.

11. A method in accordance with claim 9 including the further steps of:

establishing a target duration for said first data segment, and utilizing said first advertising marker to finalize said first data segment at a time that is independent of whether said target duration has been completed.

12. A method in accordance with claim 11 including the step of utilizing said first advertising marker to finalize said first data segment prior to the completion of said target duration.

13. In a media streaming network having a broadcast component for producing a segmented streaming broadcast and for signaling at least the beginning of a limited advertisement period of time during which said segmented streaming broadcast may be temporarily interrupted, a server having a viewer component for responding to data requests from a viewer, and a viewer for requesting data segments by their identifiers, a method comprising the steps of:

causing said viewer to utilize one of said identifiers to request data of a first data segment at a time when said data has not yet come into existence within said viewer component, determining an interval of time during which said requested data is assumed to come into existence within said viewer component, causing said viewer component to receive said request at a time when said requested data has not yet come into existence within said viewer component, waiting for said requested data for a duration of time that is not greater than said interval of time, creating said first data segment, creating a first advertisement marker, appending said first advertising marker to said first data segment to indicate to said viewer the start of said limited advertisement period of time, and, transferring at least such portion of said first data segment that contains said first advertising marker to said viewer.

14. A method in accordance with claim 13 which includes the further steps of:

creating a second data segment determining that said limited advertisement period of time has ended, creating a second advertisement marker, upon determining that said limited advertisement period of time has ended, appending said second advertisement marker to said second data segment prior to the time said second data segment is transferred to said viewer to indicate to said viewer the end of said limited advertisement period of time.

15. A method in accordance with claim 13 including the further steps of:

establishing a target duration for said first data segment, and utilizing said first advertising marker to finalize said first data segment at a time that is independent of whether said target duration has been completed.

16. A method in accordance with claim 15 including the step of utilizing said first advertising marker to finalize said first data segment prior to the completion of said target duration.

\* \* \* \* \*